United States Patent
Poorman et al.

(10) Patent No.: US 9,640,208 B2
(45) Date of Patent: May 2, 2017

(54) CALIBRATING A TAPE DRIVE

(71) Applicant: HEWLETT PACKARD ENTERPRISE DEVELOPMENT LP, Houston, TX (US)

(72) Inventors: Paul W Poorman, Boise, ID (US); Jeffrey S McAllister, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/908,727

(22) PCT Filed: Jul. 31, 2013

(86) PCT No.: PCT/US2013/053064
§ 371 (c)(1),
(2) Date: Jan. 29, 2016

(87) PCT Pub. No.: WO2015/016922
PCT Pub. Date: Feb. 5, 2015

(65) Prior Publication Data
US 2016/0189737 A1    Jun. 30, 2016

(51) Int. Cl.
*G11B 5/584* (2006.01)
*G11B 5/008* (2006.01)

(52) U.S. Cl.
CPC .......... *G11B 5/584* (2013.01); *G11B 5/00817* (2013.01); *G11B 5/00821* (2013.01)

(58) Field of Classification Search
None
See application file for complete search history.

(56) References Cited

U.S. PATENT DOCUMENTS

| 5,450,257 A | 9/1995 | Tran et al. |
| 5,629,813 A * | 5/1997 | Baca ............. G11B 5/5508 360/77.12 |
| 5,739,974 A * | 4/1998 | Miller ............ G11B 5/5508 360/75 |
| 6,144,518 A | 11/2000 | Magnusson |

(Continued)

FOREIGN PATENT DOCUMENTS

JP    03830088    10/2006

OTHER PUBLICATIONS

Engelen, J.B.C. et al., Planar Thin-film Servo Write Head for Magnetic Tape Recording (Research Paper), Nov. 2012, pp. 3539-3542; vol. 48, No. 11, http://ieeexplore.ieee.org/xpl/login.jsp?tp=&arnumber=6332692&url=%2Fstamp%2Fstamp.jsp%3Ftp%3D%26arnumber%3D6332692.

(Continued)

*Primary Examiner* — K. Wong
(74) *Attorney, Agent, or Firm* — International IP Law Group, PLLC (57) ABSTRACT

A method for calibrating a tape drive is disclosed herein. The method includes writing a calibration track onto a tape cartridge using a first tape drive. The method includes reading the calibration track using a plurality of tape drives to measure a plurality of write element offset values, in which each write element offset value corresponds to each of the plurality of tape drives. The method includes determining a calibration factor based on an average write element offset value, in which the calibration factor is used to align a write element of a drive head of the first tape drive.

15 Claims, 9 Drawing Sheets

(56) References Cited

U.S. PATENT DOCUMENTS

| | | | |
|---|---|---|---|
| 6,906,888 B1 | 6/2005 | Trabert et al. | |
| 7,116,506 B1 * | 10/2006 | Mojica | G11B 15/06 360/71 |
| 7,697,228 B2 * | 4/2010 | Bai | G11B 15/689 360/31 |
| 8,154,811 B2 | 4/2012 | Barsotti et al. | |
| 2002/0149872 A1 | 10/2002 | Koski | |
| 2005/0082407 A1 | 4/2005 | Saliba et al. | |
| 2009/0268339 A1 | 10/2009 | Trabert et al. | |
| 2010/0246043 A1 | 9/2010 | Barsotti et al. | |
| 2012/0314322 A1 | 12/2012 | Olson et al. | |

OTHER PUBLICATIONS

ISR/WO, PCT/US2013/053064, HP reference 83273355, Apr. 21, 2014, 9 pps.

* cited by examiner

CALIBRATING A TAPE DRIVE

BACKGROUND

Tape technology is an efficient and cost-effective means for storing and backing up data. A linear tape drive can read and write data onto a magnetic tape using a drive head containing read and write elements. As the data density of magnetic tapes increase, it becomes more important to accurately position the write elements that write data to the tapes in parallel tracks, as well as the read elements. During the drive head manufacturing process, the read and write elements may not be perfectly aligned in their intended positions, which may lead to errors in reading and writing data on magnetic tapes.

BRIEF DESCRIPTION OF THE DRAWINGS

Certain examples are described in the following detailed description and in reference to the drawings, in which.

DETAILED DESCRIPTION

The present disclosure is generally related to calibrating a tape drive head. In accordance with examples described herein, read and write elements of a tape drive head can be calibrated by measuring read and write element offset values, and determining calibration factors based on the read and write element offset values.

In a single-drive calibration method, a tape drive head can write a calibration track onto a tape via the tape drive head's write elements. The tape can be played back to the tape drive, and the calibration track is read by the tape drive head's read elements to measure the error between the positions of each write element in relation to a corresponding read element. This error can be referred to herein as a write element offset value. A calibration factor can be determined based on the measured write element offset values, and applied to the tape drive head to correct the positional error of the write elements. While this single-drive calibration method can help correct misaligned write elements, it does not account for the possibility of read elements that are not aligned in their intended positions. As a result, tapes written by the calibrated tape drive may still produce errors when read by another tape drive, due to a possible offset of the read elements.

In some examples, a multi-drive calibration method can be used to calibrate both write elements and read elements in a tape drive. A drive head of a first tape drive can write a calibration track onto a tape via the drive head's write elements. The calibration track can be played to a plurality of tape drives to measure a plurality of write element offset values. A calibration factor can be determined based on an average write element offset value. By using a plurality of write element offset values, as opposed to a single write element offset value, the determined calibration factor can calibrate the position of the write elements to their intended positions more accurately. This is because the average positions of the read elements across a plurality of tape drives are likely to be closer to the intended positions than the positions of the read elements of a single tape drive.

In some examples, the drive head of the first tape drive can write a second calibration track to the tape with using the more accurately-aligned write elements. This second calibration track may be referred to herein as a "gold" calibration track. The tape containing the gold calibration track can be referred to herein as a "gold calibration tape" and may be used in calibrating the drive head of another tape drive. The gold calibration track can be read by the drive head's read elements to measure the error between the positions of each read element in relation to a corresponding write element. This error can be referred to herein as a read element offset error. A read calibration factor can be determined based on the measured read element offset values. The read calibration factor can be applied to the first tape drive head to correct the positional error of the read elements.

Figure 1:
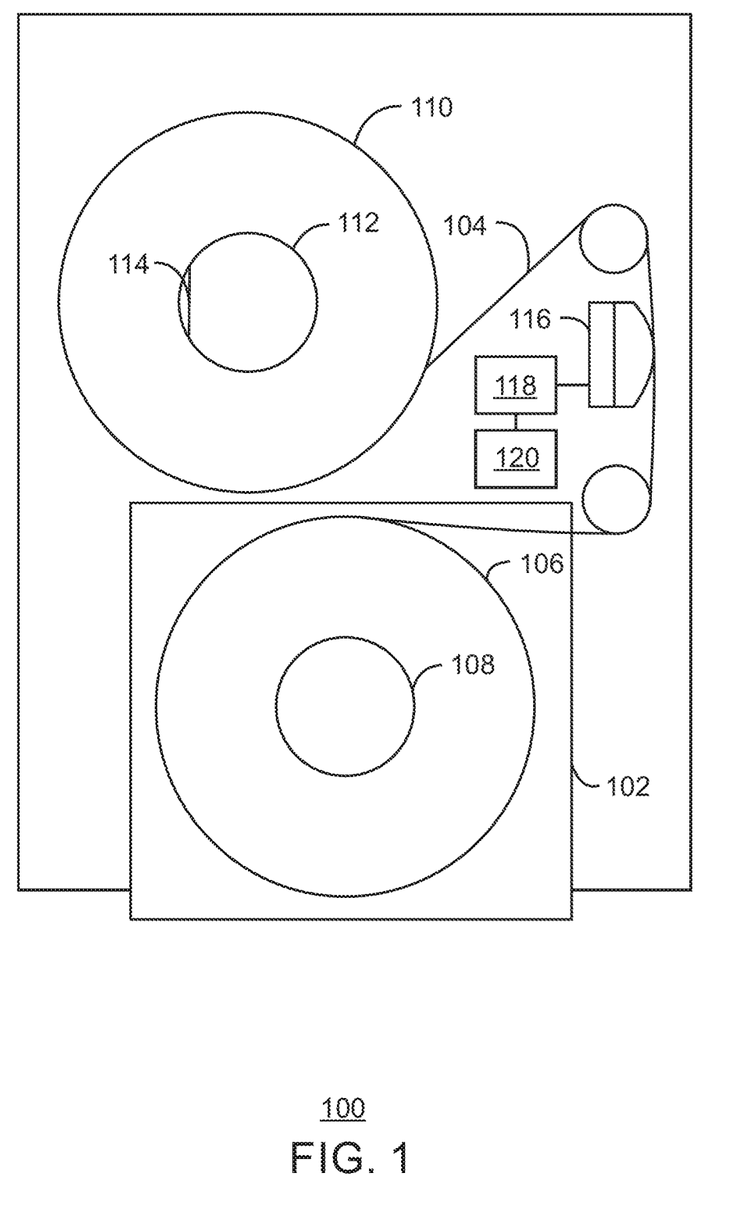
FIG. 1 is a diagram of an example tape drive.

FIG. 1 is a diagram of an example tape drive. In some examples, the tape drive 100 is a linear tape drive configured to store data. The tape drive 100 can include methods and modules for measuring and calibrating read and write element offset. The tape drive 100 is shown with a tape cartridge 102 inserted into the tape drive 100. The tape cartridge 102 can be removed from the tape drive 100, and can include a tape 104 and a cartridge reel 106. The tape 104 can be spooled around a cartridge reel hub 108 of the cartridge reel 106.

The tape cartridge 102 provides the tape 104 to the tape drive 100 when inserted. The tape drive 100 can include a drive reel 110 to accept the tape 104 from the tape cartridge 102. The tape 104 can be coupled to a drive reel 112 by a fastening device 114. During tape drive 100 operation, the tape 104 is spooled around the cartridge reel 108 and the drive reel 112 while being passed across a drive head 116. The drive head 116 can be configured to read data from or write data to the tape 104 while the tape 104 is passed across the drive head 116. In some examples, the drive head 116 includes multiple read and write elements for reading or writing a plurality of parallel tracks on the tape 104.

The tape drive 100 can include a calibration module 118 communicatively coupled to the drive head 116. The calibration module 118 may be configured to measure errors between read and write track operations on the tape 104 so as to measure offsets between the read and write elements of the drive head 116. In some examples, the calibration module 118 can apply a calibration factor to the read or write elements to correct or reduce the offsets. In some examples, a memory unit 120 is coupled to the calibration module 118. The memory unit 120 may store offset values of the read and write elements, measured from the tape 104 or otherwise. The memory unit 120 may also store a calibration factor used by the calibration module 118 to correct a read or write element offset.

Figure 2:
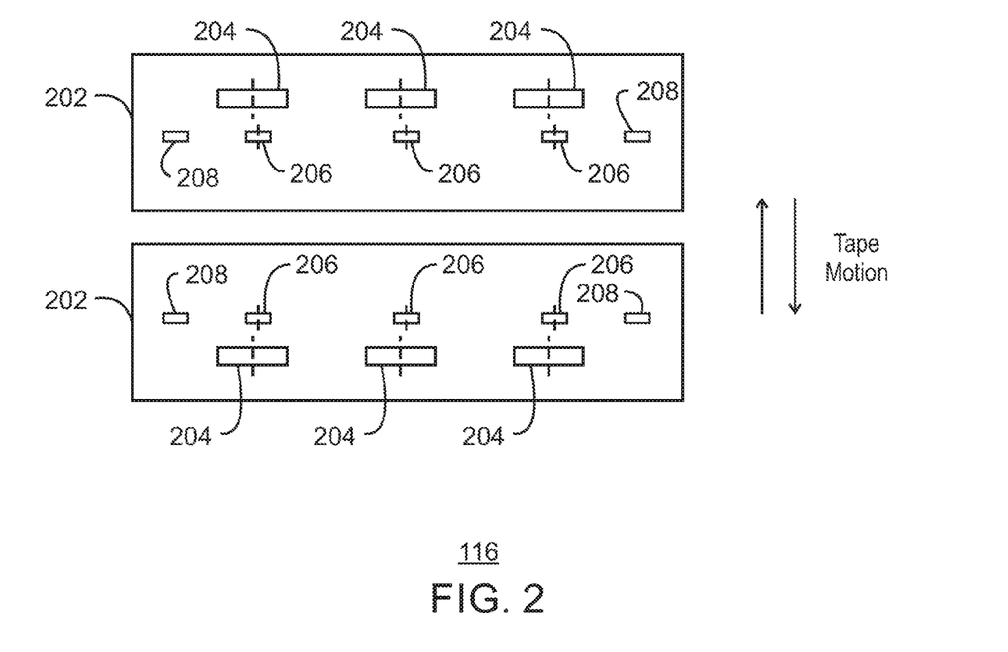
FIG. 2 is an illustration of an example drive head for a tape drive.

FIG. 2 is an illustration of an example drive head for a tape drive. In some examples, the drive head 116 includes a pair of head bumps 202. Each head bump can contain a plurality of write elements 204, a plurality of read elements 206, and a pair of servo elements 208.

The plurality of write elements 204 may be spaced along the head bump 202 to simultaneously write a plurality of parallel data tracks to a tape 104. In some examples, it may be intended that the write elements 204 are to be evenly spaced.

The plurality of read elements 206 may be spaced along the head bump 202 to simultaneously read a plurality of parallel data tracks from the tape 104. In some examples, it may be intended that the read elements 206 are to be evenly spaced.

Each read element 206 may be paired with a write element 204 such that each pairing can read and write on the same data track. In some examples, the read elements 206 can read data from the tape 104 while the write elements 204 are writing the data. In some examples, as shown in FIG. 2, the write elements 204 and the read elements 206 may not be perfectly aligned as intended. The offset error between a read element 206 and a data track written by a corresponding write element 204 can be measured by the servo elements 208. In some examples, a calibration factor can be applied to the write elements 204 such that each write element 204 can write along a track closer to its intended position. In some examples, a calibration factor can be applied to the read elements 206 such that each read element 206 can read along a track closer to its intended position.

Figure 3:
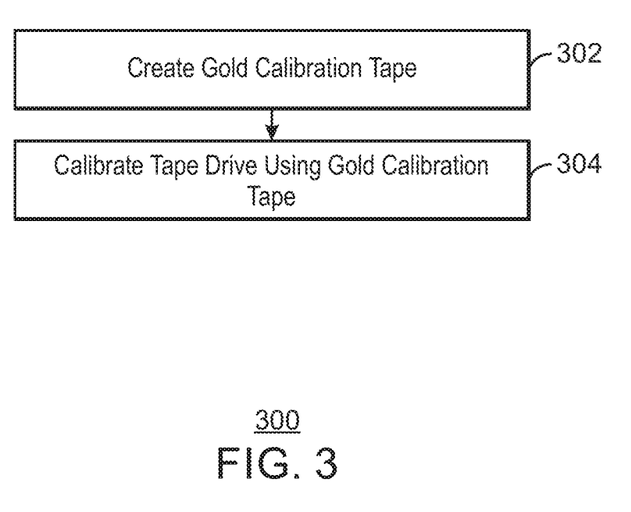
FIG. 3 is a process flow diagram of an example method for calibrating a tape drive.

FIG. 3 is a process flow diagram of an example method for calibrating a tape drive. The method 300 can be used as a standardized process for calibrating one or more tape drives.

At block 302, a gold calibration tape is created. The gold calibration tape can be created by using the positions of read elements of a plurality of tape drives to calibrate the position of write elements in a first tape drive. The calibrated write elements of the first tape drive can be used to write the gold calibration tape.

At block 304, a second tape drive is calibrated using the gold calibration tape. The second tape drive's read elements can be calibrated using the gold calibration tape. The second tape drive's write elements can be calibrated using the second tape drive's calibrated read elements. The method 300 of FIG. 3 is explained in further detail in FIG. 4.

Figure 4:
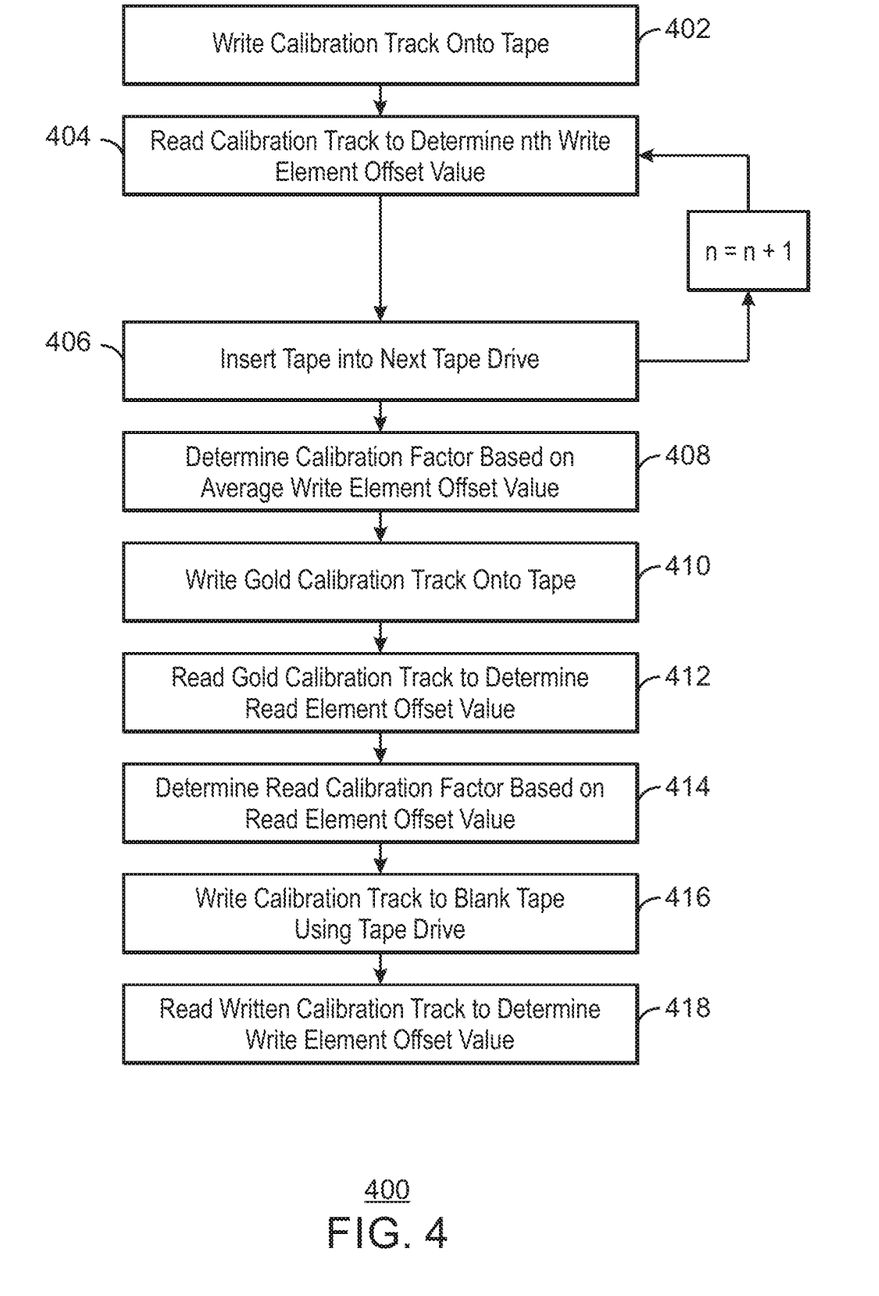
FIG. 4 is a process flow diagram of an example method for creating a gold calibration tape for calibrating a tape drive.

FIG. 4 is a process flow diagram of an example method for creating a gold calibration tape for calibrating a tape drive. The method 400 can performed in a library containing a tape cartridge and a plurality of tape drives. The created gold calibration tape can be later used to calibrate multiple tape drives.

At block 402, a calibration track is written onto a tape of the tape cartridge using a first tape drive from the plurality of tape drives. The calibration track can be written by the first tape drive's write elements.

At block 404, the calibration track is read by a tape drive from the plurality of tape drives to measure a write element offset value. For each tape drive used to read the calibration track, a corresponding write element offset value is determined. In some examples, the write element offset values can be stored on the tape cartridge, on a memory unit or on the tape itself, for example.

At block 406, the tape cartridge is inserted into a next tape drive. In some examples, the method 400 can revert back to block 404 until a certain number of write element offset values have been obtained.

At block 408, a calibration factor is determined based on an average write element offset value. In some examples, the average write element offset value is determined based on the mean, median, or mode of the plurality of write element offset values. In some examples, determining the average write element offset value includes eliminating outliers or applying a weighting scheme. The calibration factor can be computed by taking the additive inverse of the average write element offset value. The calibration factor may be stored in a memory unit in the first tape drive.

At block 410, a gold calibration track is written onto the tape using the first tape drive. The gold calibration track can be written by the first tape drive's write elements, which have been calibrated to their intended positions by the calibration factor. The resulting tape, with the gold calibration track written onto it, can be referred to henceforth as a gold calibration tape.

At block 412, the gold calibration track is read by a tape drive to measure a read element offset value of the tape drive. The tape drive can be the first tape drive, or it can be a second tape drive. The tape cartridge containing the gold calibration tape can be inserted into the tape drive.

At block 414, a read calibration factor is determined based on the read element offset value of the tape drive. The read calibration factor can be computed by taking the additive inverse of the read element offset value. The read calibration factor may be stored in the memory unit in the tape drive.

At block 416, a write calibration track is written onto a blank tape of a second tape cartridge using the tape drive. The write calibration track can be written by the tape drive's write elements.

At block 418, the write calibration track is read by the read elements of the second tape drive to measure a write element offset value of the tape drive. In some examples, the write element offset value of the tape drive can be stored on a memory unit in the tape drive. The write element offset value of the tape drive can be used to compute a write calibration factor used to calibrate the tape drive's write elements.

Figure 5:
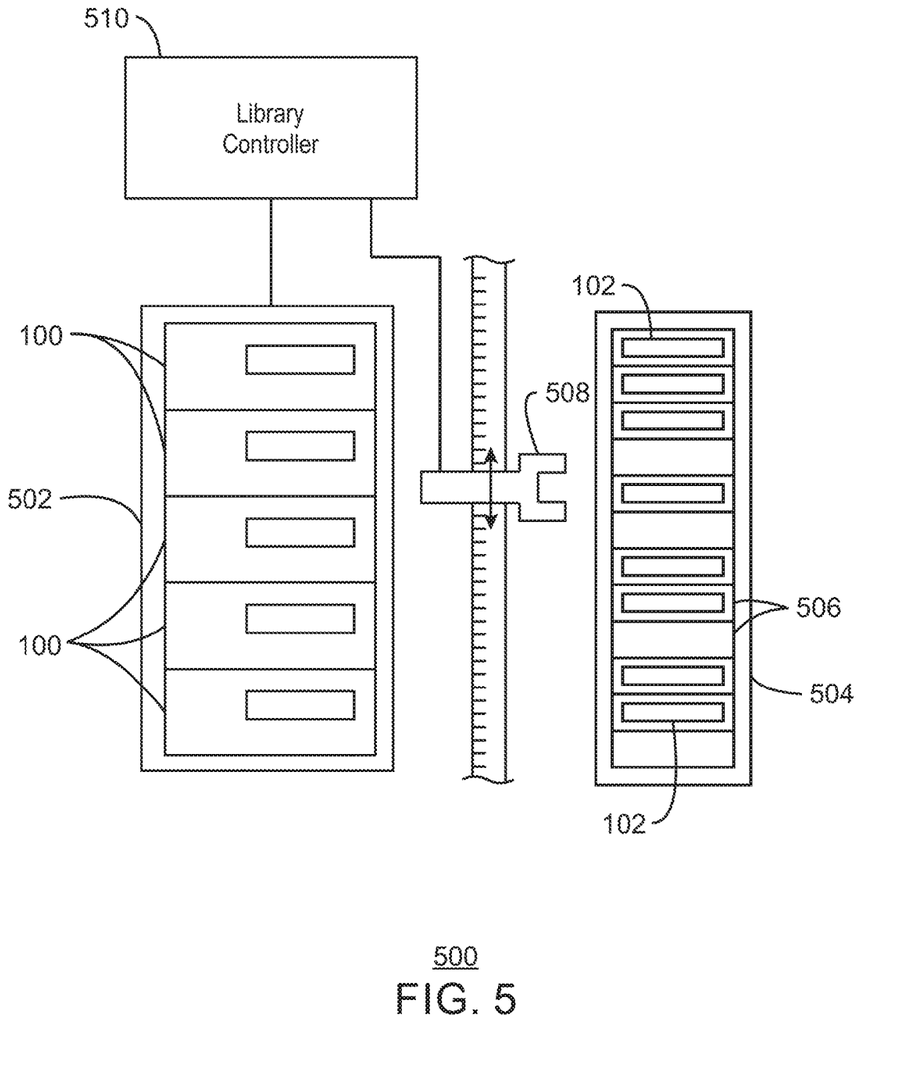
FIG. 5 is a block diagram of an example tape drive library.

FIG. 5 is a block diagram of an example tape drive library. The tape drive library 500 includes a plurality of tape drives 100, which may be stacked in a rack 502 or otherwise physically arranged with respect to an array 504 of storage bays 506 containing removable tape cartridges 102. In some examples, a controlled robot picker 508 is operable to select a tape cartridge 102, insert the tape cartridge 102 into a tape drive 100, or replace the tape cartridge 102 in a storage bay 506. A library controller 510 is operable to coordinate operations within the tape drive library 500, and perform the method 400 as described with regards to FIG. 4. In some examples, the library controller 510 can also be the mechanism which controls the picker 508, although operations performed by the picker 508 may also be performed manually.

Figure 6A:
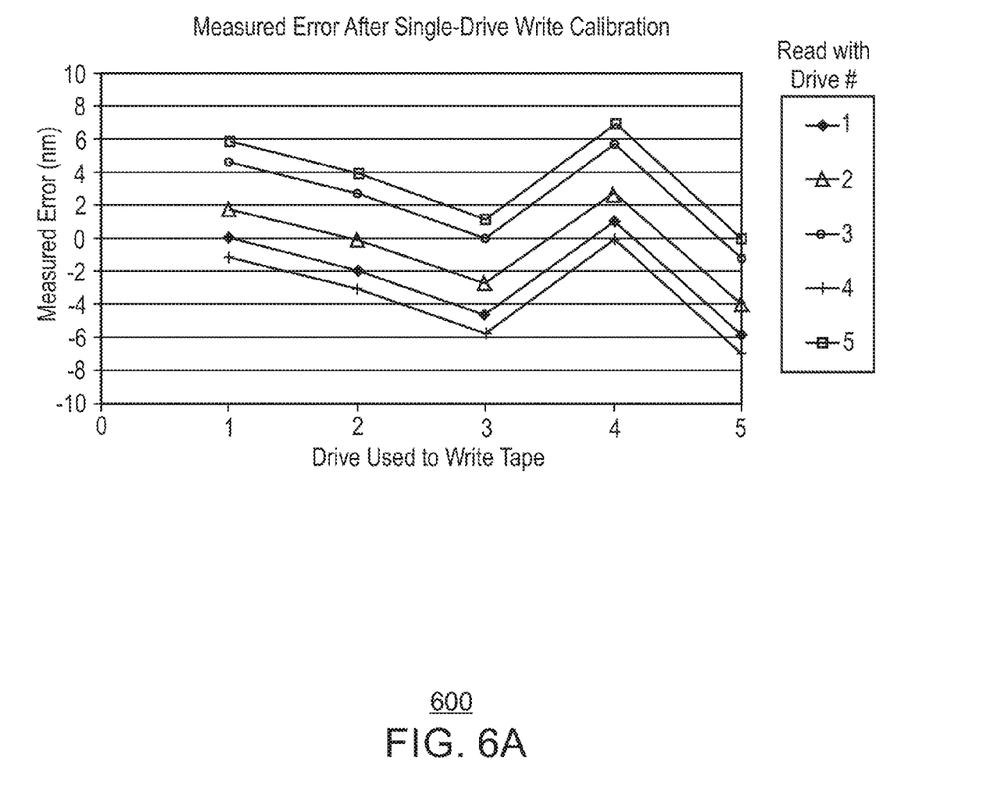
FIGS. 6A, 6B, and 6C are graphs illustrating example error results from calibration methods.
Figure 6B:
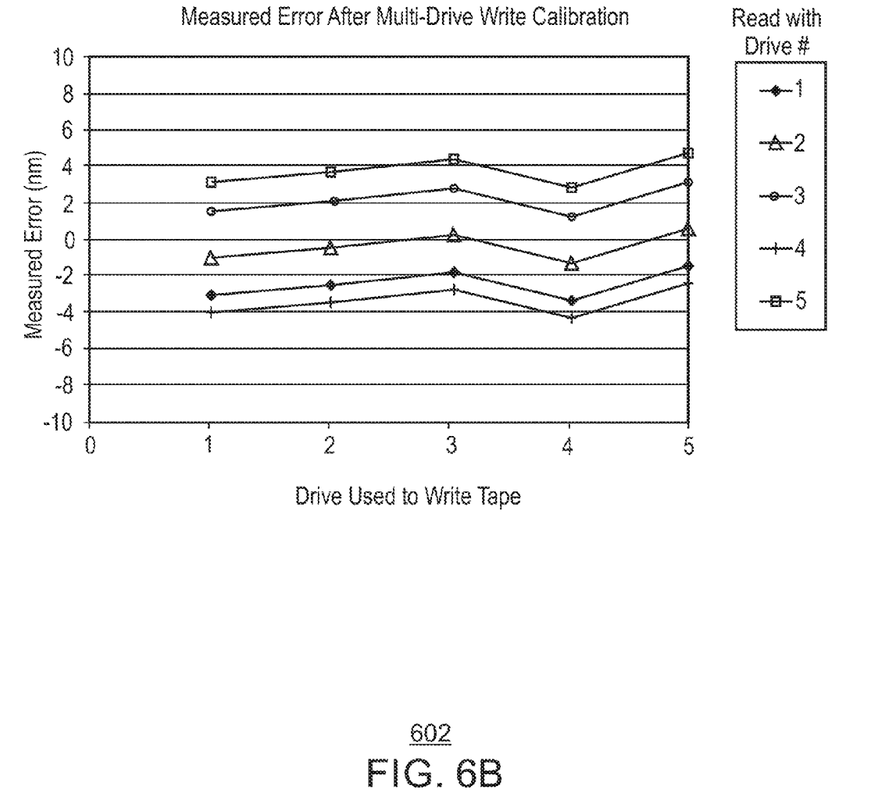
Figure 6C:
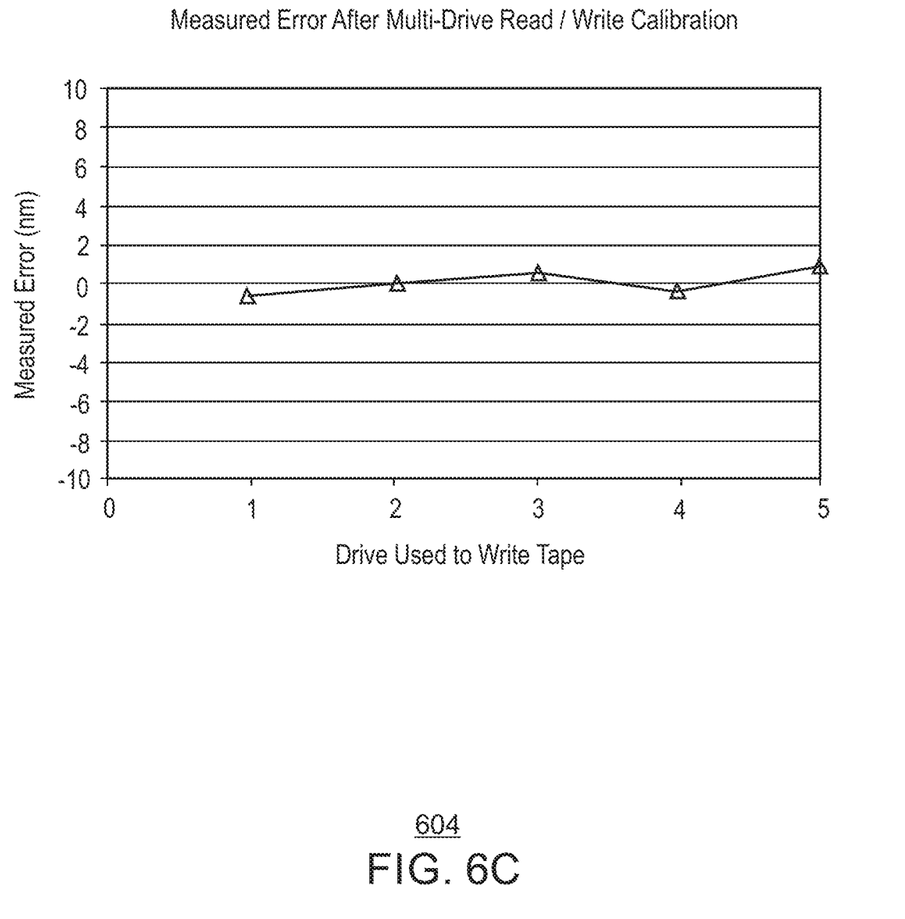

FIGS. 6A, 6B, and 6C are graphs illustrating example error results from calibration methods. In the examples, five tape drives of similar build and quality are calibrated using the embodied methods for single-drive and multi-drive calibration. The average offset error of each drive is measured using post-calibration tapes written by each of the five tape drives.

FIG. 6A illustrates error results of the five tape drives after calibrating write elements of each tape drive using single-drive calibration. Each tape drive writes a calibration tape, which is then read by only the parent drive (the tape drive used to write the calibration tape) to measure a write element offset value. A calibration factor is determined based on the write element offset value. The calibration factor is applied to the parent drive's write elements.

The graph 600 displays the measured offset error of each tape drive as tested using each post-calibration tape. It is to be noted that for each tape drive, the offset error appears to be zero when measured with the drive's own post-calibration tape. However, when a different post-calibration tape is read, the measured offset error is nonzero. Likewise, a single post-calibration tape can produce a different offset error in each of the tape drives. These discrepancies may stem from the fact that the calibration factor used to calibrate the write elements of each tape drive is determined based on the parent drive's read elements, which may also be misaligned.

FIG. 6B illustrates error results of the five tape drives after calibrating write elements of each tape drive using multi-drive calibration. Each tape drive writes a calibration tape, which is then read by all of the tape drives to measure a write element offset value from each tape drive. A calibration factor is determined based on the average of the write element offset values. The calibration factor is applied to the parent drive's write elements.

The graph 602 displays the measured offset error of each tape drive as tested using each post-calibration tape. It is to be noted that for a given tape drive, the measured offset error appears to be consistent for each post-calibration tape read. However, a single post-calibration tape still produces a different offset error in each of the tape drives, due to the misalignment of each tape drive's read elements.

FIG. 6C illustrates error results of the five tape drives calibrating read and write elements of each tape drive using multi-drive calibration. After calibrating its write elements using multi-drive calibration, each tape drive writes a gold calibration tape, which is then read by all of the tape drives to measure a read element offset value from each tape drive. In this example, the read calibration factor for each tape drive is determined based on the average of the read element offset values measured using the tape drive. The read calibration factor is applied to the drive's read elements.

The graph 604 displays the measured offset error, which is identical across all of the tape drives. It is to be noted that for each given tape drive, the measured offset error appears to be in proximity to zero for each post-calibration tape read.

Figure 7:
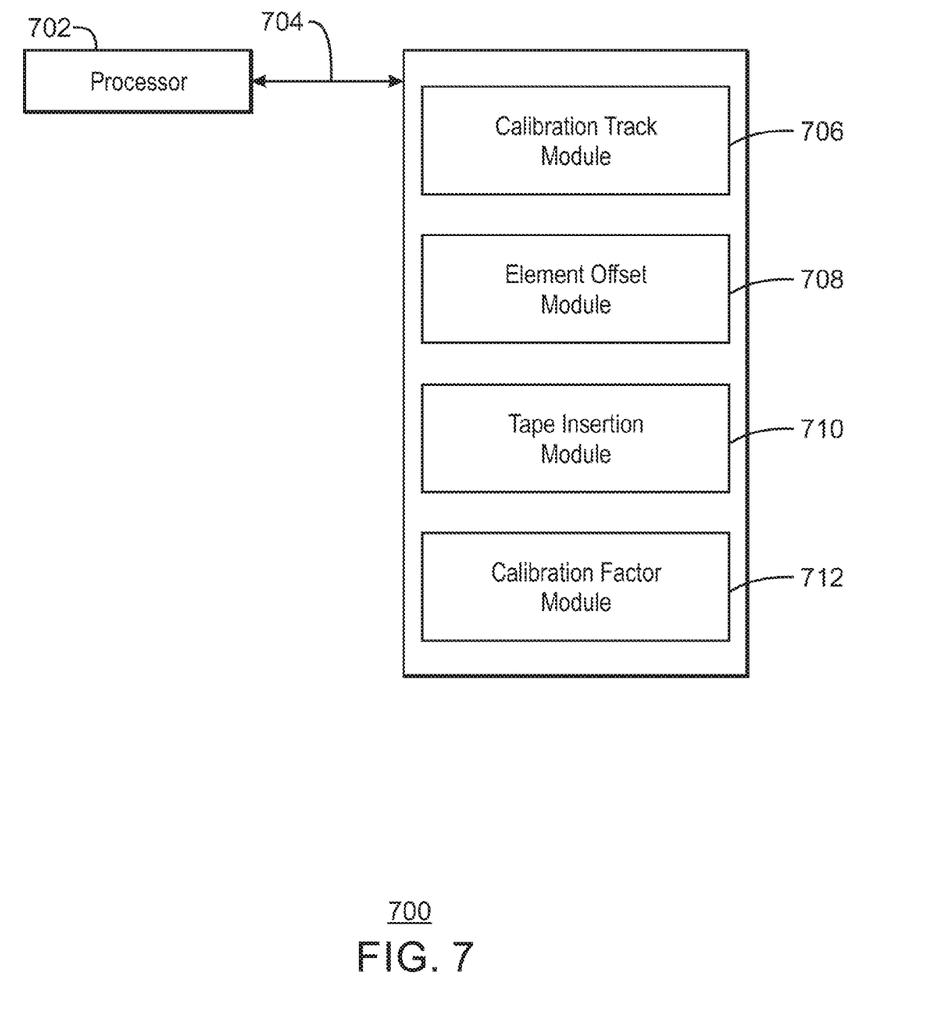
FIG. 7 is a block diagram showing an example tangible, non-transitory, computer-readable medium that stores code configured to calibrate a tape drive.

FIG. 7 is a block diagram showing an example tangible, non-transitory, computer-readable medium that stores code configured to calibrate a tape drive. The tangible, non-transitory, computer-readable medium 700 can include random access memory (RAM), a hard disk drive, an array of hard disk drives, an optical drive, an array of optical drives, a non-volatile memory, a flash drive, a digital versatile disk (DVD), or a compact disk (CD), among others. The tangible, non-transitory, computer-readable medium 700 may be accessed by a processor 702 over a computer bus 704. Furthermore, the tangible, non-transitory, computer-readable medium 700 may include code configured to perform the methods described herein.

The various software components discussed herein may be stored on the tangible, non-transitory, computer-readable medium 700. A region 706 on the tangible, non-transitory, computer-readable medium 700 can include a calibration track module to write a calibration track onto a tape of a tape cartridge. A region 708 can include an element offset module to measure a write element offset value or a read element offset value of a tape drive head. A region 710 can include a tape insertion module to insert the tape cartridge into a tape drive. A region 712 can include a calibration factor module to determine a calibration factor based on the write element offset value or the read element offset value.

Although shown as contiguous blocks, the software components can be stored in any order or configuration. For example, if the tangible, non-transitory, computer-readable medium 700 is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method, comprising:
   writing a calibration track onto a tape in tape a cartridge using a first tape drive;
   reading the calibration track using a plurality of tape drives to measure a plurality of write element offset values, each of the plurality of tape drives to produce a write element offset value; and
   determining a calibration factor based on an average write element offset value, the calibration factor used to align a write element of a drive head of the first tape drive.

2. The method of claim 1, comprising writing a gold calibration track to the tape in the tape cartridge using the first tape drive after aligning the write element of the drive head of the first tape drive using the calibration factor.

3. The method of claim 2, comprising:
   reading the gold calibration track using a second tape drive to measure a read element offset value corresponding to the second tape drive; and
   determining a read calibration factor based on the read element offset value, the read calibration factor to align a read element of the drive head of the second tape drive.

4. The method of claim 3, comprising:
   writing a write calibration track to a blank tape using the second tape drive after aligning the read element of the drive head of the of the second tape drive;
   reading the write calibration track using the second tape drive to measure a write element offset value of the second tape drive; and
   determining a write calibration factor based on the write element offset value of the second tape drive, the write calibration factor to align a write element of the drive head of the second tape drive.

5. The method of claim 1, comprising storing the plurality of write element offset values on the tape in the tape cartridge.

6. A tape drive library, comprising:
   a plurality of tape drives including a first tape drive;
   a tape cartridge; and
   and a library controller to:
      write a calibration track onto a tape in the tape cartridge using the first tape drive;
      read the calibration track using the plurality of tape drives to measure a plurality of write element offset values; each write element offset value corresponding to each of the plurality of tape drives; and
      determine a calibration factor based on an average write element offset value, the calibration factor used to align a write element of a drive head of the first tape drive.

7. The tape drive library of claim 6, the library controller to write a gold calibration track to the tape in the tape cartridge using the first tape drive after aligning the write element of the drive head of the first tape drive using the calibration factor.

8. The tape drive library of claim 7, the library controller to:
   read the gold calibration track using a second tape drive to measure a read element offset value corresponding to the second tape drive; and determine a read calibration factor based on the read element offset value, the read calibration factor to align a read element of the drive head of the second tape drive.

9. The tape drive library of claim 8, the library controller to:
write a write calibration track to a blank tape using the second tape drive after aligning the read element of the drive head of the of the second tape drive;
read the write calibration track using the second tape drive to measure a write element offset value of the second tape drive; and
determine a write calibration factor based on the write element offset value of the second tape drive, the write calibration factor to align a write element of the drive head of the second tape drive.

10. The tape drive library of claim 6, the library controller to store the plurality of write element offset values on the tape in the tape cartridge.

11. A tangible, non-transitory, computer-readable medium comprising instructions configured to direct a processor to:
write a calibration track onto a tape in a tape cartridge using a first tape drive;
read the calibration track using a plurality of tape drives to measure a plurality of write element offset values; each write element offset value corresponding to each of the plurality of tape drives; and
determine a calibration factor based on an average write element offset value, the calibration factor used to align a write element of a drive head of the first tape drive.

12. The tangible, non-transitory, computer-readable medium of claim 11, comprising instructions configured to direct the processor to write a gold calibration track to the tape in the tape cartridge using the first tape drive after aligning the write element of the drive head of the first tape drive using the calibration factor.

13. The tangible, non-transitory, computer-readable medium of claim 12, comprising instructions configured to direct the processor to:
read the gold calibration track using a second tape drive to measure a read element offset value corresponding to the second tape drive; and
determine a read calibration factor based on the read element offset value, the read calibration factor to align a read element of the drive head of the second tape drive.

14. The tangible, non-transitory, computer-readable medium of claim 13, comprising instructions configured to direct the processor to:
write a write calibration track to a blank tape using the second tape drive after aligning the read element of the drive head of the of the second tape drive;
read the write calibration track using the second tape drive to measure a write element offset value of the second tape drive; and
determine a write calibration factor based on the write element offset value of the second tape drive, the write calibration factor to align a write element of the drive head of the second tape drive.

15. The tangible, non-transitory, computer-readable medium of claim 11, comprising instructions configured to direct the processor to store the plurality of write element offset values on the tape in the tape cartridge.

* * * * *